US006798539B1

(12) United States Patent
Wang et al.

(10) Patent No.: US 6,798,539 B1
(45) Date of Patent: Sep. 28, 2004

(54) METHOD FOR MOIRE-FREE COLOR HALFTONING USING NON-ORTHOGONAL CLUSTER SCREENS

(75) Inventors: Shen-Ge Wang, Fairport, NY (US); Zhigang Fan, Webster, NY (US); Zhenhuan Wen, Rochester, NY (US)

(73) Assignee: Xerox Corporation, Stamford, CT (US)

(*) Notice: Subject to any disclaimer, the term of this patent is extended or adjusted under 35 U.S.C. 154(b) by 887 days.

(21) Appl. No.: 09/698,104

(22) Filed: Oct. 30, 2000

(51) Int. Cl.[7] .............................. H04N 1/52; H04N 1/58
(52) U.S. Cl. .................... 358/1.9; 358/3.26; 358/533; 358/534
(58) Field of Search ..................... 358/1.9, 3.2, 3.26, 358/533, 534, 535, 536, 3.17

(56) References Cited

U.S. PATENT DOCUMENTS

| 4,758,886 A | * | 7/1988 | Rylander | 358/534 |
|---|---|---|---|---|
| 5,323,245 A | | 6/1994 | Rylander | 358/536 |
| 5,371,612 A | | 12/1994 | Sakamoto | 358/3.2 |
| 5,583,660 A | | 12/1996 | Rylander | 358/3.17 |
| 2002/0089708 A1 | * | 7/2002 | Cheng et al. | 358/534 |
| 2003/0035145 A1 | * | 2/2003 | Wang | 358/3.06 |
| 2003/0081256 A1 | * | 5/2003 | Wang et al. | 358/3.06 |

OTHER PUBLICATIONS

Thomas M. Holladay, "An Optimum Algorithm For Halftone Generation For Displays and Hard Copies", *Proceedings of the SID*, vol. 21/2, 1980.

* cited by examiner

*Primary Examiner*—Scott Rogers
(74) *Attorney, Agent, or Firm*—Oliff & Berridge, PLC

(57) ABSTRACT

The invention provides methods for using single-cell non-orthogonal cluster screens to satisfy the moiré-free conditions for color halftoning. The invention also provides methods that combine single-cell non-orthogonal cluster screens and line screens for moiré-free color halftoning. Particularly, the selection of these single-cell halftone screens is determined by satisfying moiré-free conditions provided in the respective spatial or frequency equations.

35 Claims, 12 Drawing Sheets

METHOD FOR MOIRE-FREE COLOR HALFTONING USING NON-ORTHOGONAL CLUSTER SCREENS

BACKGROUND OF THE INVENTION

1. Field of Invention

This invention is directed to a process for substantially moiré-free halftoning color documents using combinations of non-orthogonal cluster screens.

2. Description of Related Art

With the advent of inexpensive digital color printers, methods and systems of color digital halftoning have become increasingly important. It is well understood that most digital color printers operate in a binary mode, i.e., for each color separation, a corresponding color spot is either printed or not printed at a specified location or pixel. Digital halftoning controls the printing of color spots, where spatially averaging the printed color spots of all the color separations provides the illusion of the required continuous color tones.

The most common halftone technique is screening, which compares the required continuous color tone level of each pixel for each color separation with one of several predetermined threshold levels. The predetermined threshold levels are stored in a halftone screen. If the required color tone level is darker than the threshold halftone level, a color spot is printed at the specified pixel. Otherwise the color spot is not printed. It is understood in the art that the distribution of printed pixels depends on the design of the halftone screen. For cluster halftone screens, all printed pixels are grouped into one or more clusters. If a cluster-halftone screen only generates a single cluster, it is referred to as a single-cell halftone screen or a single-cell halftone dot. Alternatively, halftone screens may be dual-dot, tri-dot, quad-dot, or the like.

Halftone screens are typically two-dimensional threshold arrays and are relatively small in comparison to the overall image or document to be printed. Therefore, the screening process uses an identical halftone screen repeated for each color separation in a manner similar to tiling. The output of the screening process, using a single-cell halftone dot, includes a binary pattern of multiple small "dots", which are regularly spaced and is determined by the size and the shape of the halftone screen. In other words, the screening output, as a two-dimensionally repeated pattern, possesses two fundamental spatial frequencies, which are completely defined by the geometry of the halftone screen.

While halftoning is often described in terms of the halftone dots, it should be appreciated that halftone dots can also posses shapes ranging from rectangles, squares, lines, and the like. Various digital halftone screens having different shapes and angles are described in *An Optimum Algorithm for Halftone Generation for Displays and Hard Copies*, by T. M. Holladay, Proc. Soc. for Information Display, 21, p. 185 (1980).

A common problem that arises in digital color halftoning is moire patterns. Moiré patterns are undesirable interference patterns that occur when two or more color halftone separations are printed over each other. Since color mixing during the printing process is a non-linear process, frequency components other than the fundamental frequencies of the two or more color halftone separations can occur in the final printout. For example, if an identical halftone screen is used for two color separations, theoretically, there should be no moire patterns. However, any slight misalignment between the two color halftone separations occurring from an angular difference and/or a scalar difference will result in two slightly different fundamental frequencies, which will be visibly evident as a very pronounced moire interference pattern in the output. To avoid, for example, two-color moire patterns due to misalignment, or for other reasons, different halftone screens are commonly used for different color separations, where the fundamental frequencies of the different halftone screens are separated by relatively large angles. Therefore, the frequency difference between any two fundamental frequencies of the different screens will be large enough so that no visibly noticeable moire patterns are produced.

In selecting different halftone screens, for example, for three color separations, it is desirable to avoid any two-color moire as well as any three-color moire. It is well known that in the traditional printing industry that three halftone screens, which are square in shape and identical, can be placed at 15°, 45° and 75°, respectively, from a point of origin, to provide the classical three-color moiré-free solution. This is described in *Principles of Color Reproduction*, by J. A. G. Yule, John Wiley & Sons. N.Y. 1967.

However, for digital halftoning, the freedom to rotate a halftone screen is limited by the raster structure, which defines the position of each pixel. Since tan(15°) and tan (75°) are irrational numbers, rotating a halftone screen to 15° or 75° cannot be exactly implemented in digital halftoning. To this end, some methods have been proposed to provide approximate instead of exact moiré-free solutions. For example, in U.S. Pat. Nos. 5,323,245 and 5,583,660, this problem is approached by using a combination of two or more perpendicular, unequal frequency screen patterns and non-perpendicular, equal frequency non-conventional screen patterns. However, all these approximate solutions result in some halftone dots having centers that do not lie directly on addressable points, or on the pixel positions defined by the raster structure. Therefore, the shape and center location varies from one halftone dot to another. Consequently, additional interference or moire between the screen frequencies and the raster frequency can occur. In another approach, U.S. Pat. No. 5,371,612 discloses a moire prevention method to determine screen angles and sizes that is usable solely for square-shaped, halftone screens.

SUMMARY OF THE INVENTION

This invention provides systems and methods that combine single-cell non-orthogonal cluster screens in different color separations for substantially moiré-free color halftoning.

This invention separately provides systems and methods that combine single-cell non-orthogonal cluster screens and line screens in different color separations for substantially moiré-free color halftoning.

In various exemplary embodiments, the combination of non-orthogonal single-cell halftone screens is determined by satisfying moiré-free conditions in spatial or frequency space for the functions that define the non-orthogonal single cell halftone screens.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

It is well known that color halftone printers are susceptible to moire patterns if the halftone dots of a given color separation spatially overlap the halftone dots of another color separation. Therefore, there has been a long-felt need for convenient systems and methods for determining the spatial and angular positioning of the halftone dots necessary to avoid moire patterns.

It should be appreciated that, according to this invention, a single-cell halftone dot does not necessarily have to be square in shape. In fact, in view of the following teachings according to this invention, it is beneficial to consider a more general single-cell halftone dot shape other than a square, such as, for example, a non-orthogonal parallelogram. It should be further appreciated, however, that a square can be considered to be a subset of the more general class of parallelograms. Therefore, the following discussion regarding exemplary non-orthogonal parallelograms can be equally applied to square halftone dots, as desired.

Figure 1:
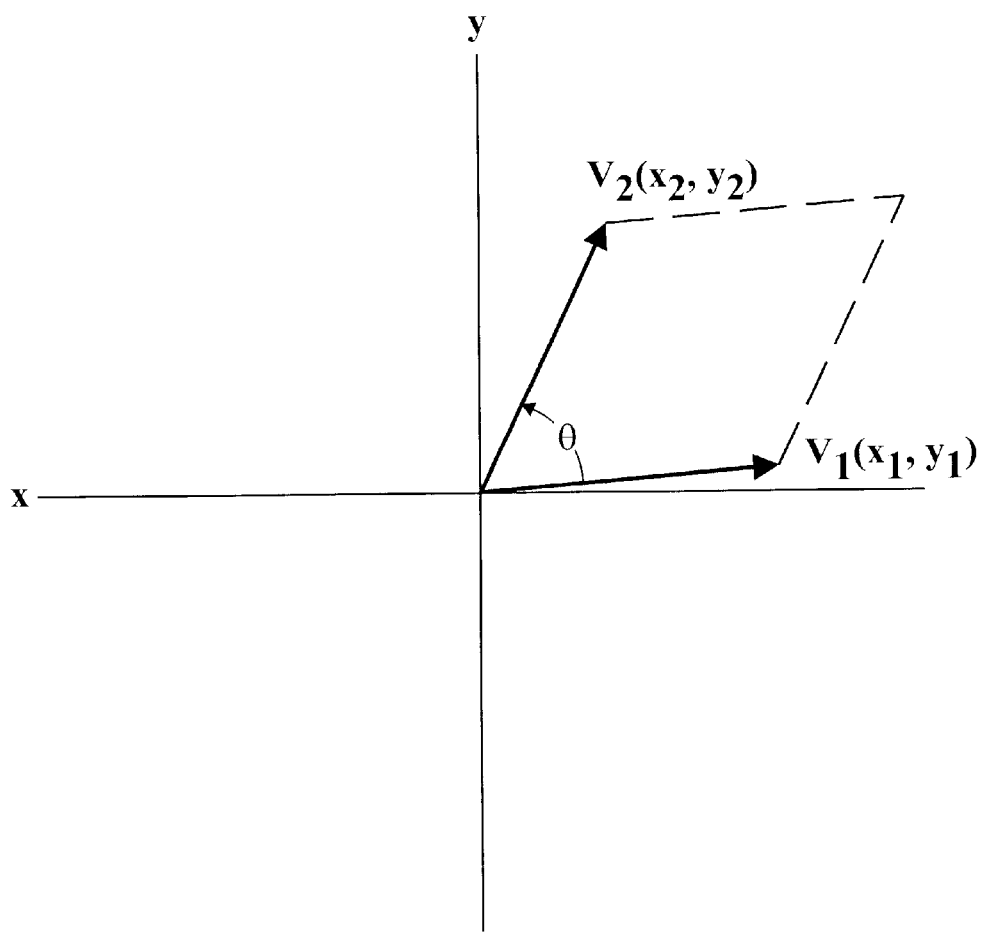
FIG. 1 is a two-dimensional spatial vector representation of a single-cell halftone screen.

To this end, as shown in FIG. 1, a single-cell halftone dot can be an arbitrarily shaped parallelogram and can be represented in the spatial domain by two vectors, $V_1=(x_1, y_1)$ and $V_2=(x_2, y_2)$. Since the specified halftone screen is a single-cell screen, the spatial domain representation is defined by the corresponding raster integer coordinates. In other words, the two spatial vectors $V_1$ and $V_2$ are specified by spatial coordinate values $x_1$, $y_1$, $x_2$ and $y_2$. If the given single-cell halftone dot represented by the graph shown in FIG. 1 is used by a halftone screening system, such as that shown in FIG. 13, the output will appear as a two-dimensional repeated or "tiled" pattern.

Figure 2:
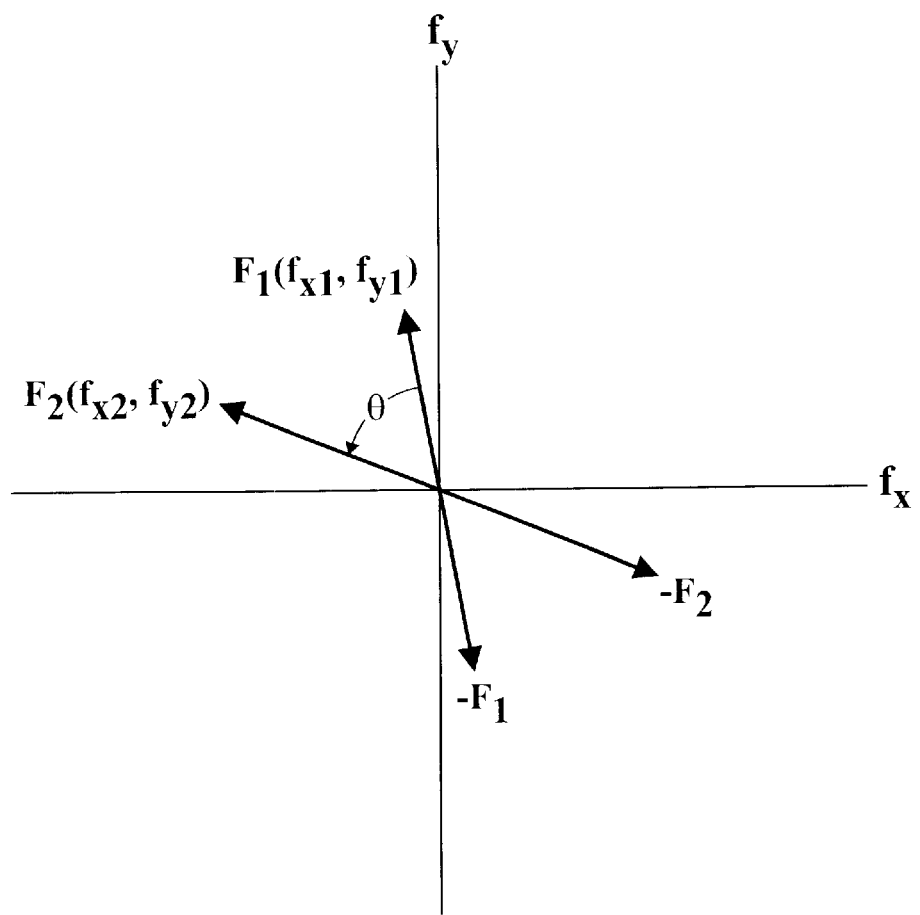
FIG. 2 is a frequency vector representation of the halftone screen of FIG. 1.

It should be appreciated that, by using Fourier analysis, a two-dimensional repeated pattern can be represented in the frequency domain by two frequency vectors, $F_1=(f_{x_1}, f_{y_1})$ and $F_2=(f_{x_2}, f_{y_2})$. FIG. 2. illustrates, for example, the two frequency vectors, $F_1$ and $F_2$, corresponding to the Fourier transforms of the two spatial vectors, $V_1$ and $V_2$, respectively. It should also be appreciated that the two frequency vectors $F_1$ and $F_2$ are perpendicular to the two spatial vectors $V_1$ and $V_2$, respectively, and that their moduli are given by:

$$|F_1| = \frac{1}{|V_2 \sin\theta|}, \quad \text{and} \tag{1a}$$

$$|F_2| = \frac{1}{|V_1 \sin\theta|}; \tag{1b}$$

where θ represents the angle between the vectors $V_1$ and $V_2$, which is also equal to the angle between the frequency vectors $F_1$ and $F_2$. In general, the moduli $|F_1|$ and $|F_2|$ are real numbers.

Also, the area A of the parallelogram encompassed by $V_2$ and $V_1$ can be represented as:

$$A = |V_1 V_2 \sin\theta|. \tag{2a}$$

Alternately, the area A of the parallelogram can be written as a function of the spatial coordinates $x_1$, $y_1$, $x_2$ and $y_2$; i.e., as:

$$A = |x_1 y_2 - x_2 y_1|. \tag{2b}$$

Correspondingly, using Eqs. (2a) and (2b), Eqs. (1a) and (1b) can be recast as:

$$|F_1| = \frac{|V_1|}{A}, \quad \text{and} \tag{3a}$$

$$|F_2| = \frac{|V_2|}{A}. \tag{3b}$$

The vectors $F_1$ and $F_2$ can be decomposed into their scalar components as:

$$f_{x_1} = \frac{-y_1}{A}, \tag{4a}$$

$$f_{y_1} = \frac{x_1}{A}, \tag{4b}$$

$$f_{x_2} = \frac{-y_2}{A}, \quad \text{and} \tag{4c}$$

$$f_{y_2} = \frac{x_2}{A}. \tag{4d}$$

Therefore, Eqs. (4a)–(4d) express the frequency-to-spatial-component relationship for a cell defined by the spatial vectors $V_1$ and $V_2$. Although, in general, the frequency components, $f_{x_1}$, $f_{y_1}$, $f_{x_2}$, and $f_{y_2}$ are real numbers, they are also rational numbers completely defined by the four integer coordinate values, $x_1$, $y_1$, $x_2$ and $y_2$. Since Eqs.

(4a)–(4d) describe a corresponding "mapping" of the frequency components to the spatial components, it should be appreciated that any analysis of the moiré-free conditions in the frequency domain can be easily translated into a spatial domain specification. It should be appreciated that, while the above equations are developed in relation to a non-orthogonal single-cell halftone dot having a parallelogram-like shape, it is apparent that the above equations may suitably describe other non-parallelogram shaped dots, for example, squares, rectangles, triangles, ellipses, etc., without departing from the spirit or scope of this invention.

Figure 3:
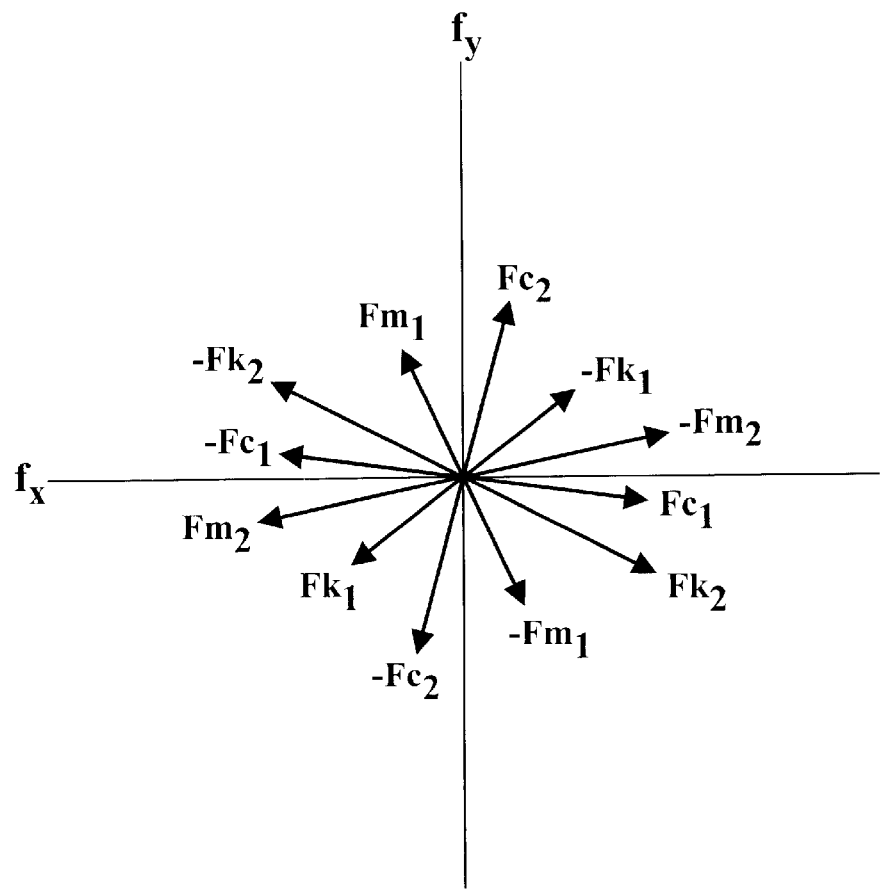
FIG. 3 illustrates a frequency domain representation of three single-cell halftone screens.

To this end, FIG. 3 is an exemplary vector representation in the frequency domain of three parallelogram halftone cells in the spatial domain used in the cyan (c), magenta (m), and black (k) color separations, respectively. As shown in FIGS. 1 and 2, the cyan, magenta, and black parallelogram single-cell halftone screens can be represented by pairs of spatial vectors $V_{1_c}$ and $V_{2_c}$, $V_{1_m}$ and $V_{2_m}$, and $V_{1_k}$ and $V_{2_k}$, respectively, corresponding to the frequency vector pairs $F_{1_c}$ and $F_{2_c}$, $F_{1_m}$ and $F_{2_m}$, and $F_{1_k}$ and $F_{2_k}$, respectively.

From FIG. 3, it is apparent that, to substantially reduce the likelihood of any three-color moire occurring in any image printed using three single-cell halftone screens, the frequency vectors of the three color separations, for example, cyan, magenta and black, should satisfy the following vector equations:

$$F_{c_1} + F_{m_1} + F_{k_1} = 0, \text{ and} \tag{5a}$$

$$F_{c_2} + F_{m_2} + F_{k_2} = 0. \tag{5b}$$

Figure 4:
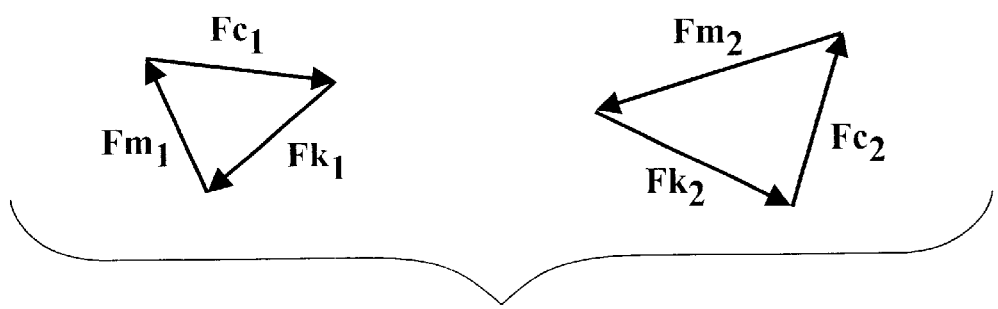
FIG. 4 illustrates an exemplary frequency domain representation of FIG. 3 constrained to satisfy moiré-free conditions.

FIG. 4 is a vector diagram illustrating the exemplary moiré-free vector relationships defined in Eqs. (5a) and (5b). It should be appreciated from frequency analysis that, for any frequency vector $F(f_x, f_y)$, there is always a conjugate frequency vector $F(-f_x, -f_y)$, hereafter denoted as $-F$. Therefore, it should also be appreciated that the two vectors $F$ and $-F$ are exchangeable. Further, it should be appreciated that the arbitrary indices 1 and 2 may be exchanged between the two frequency vectors $F_1$ and $F_2$ in each color separation. Thus, Eqs. (5a) and (5b) can be considered as a general description for the three-color moiré-free condition, which can include all other possible combinations, such as, for example, the following Eqs. (5c) and (5d):

$$F_{c_2} + F_{m_1} - F_{k_1} = 0, \text{ and} \tag{5c}$$

$$F_{c_1} - F_{m_2} - F_{k_2} = 0. \tag{5d}$$

Using the scalar components of the frequency representation and Eqs. (4a)–(4d) and the above moiré-free conditions, Eqs. (5a) and (5b) can be translated into the following spatial vector equations, Eqs. (6a) and (6b), or scalar equations, Eqs. (7a)–(7d):

$$\frac{V_{c_1}}{A_c} + \frac{V_{m_1}}{A_m} + \frac{V_{k_1}}{A_k} = 0, \text{ and} \tag{6a}$$

$$\frac{V_{c_2}}{A_c} + \frac{V_{m_2}}{A_m} + \frac{V_{k_2}}{A_k} = 0; \text{ or,} \tag{6b}$$

$$\frac{x_{c_1}}{A_c} + \frac{x_{m_1}}{A_m} + \frac{x_{k_1}}{A_k} = 0, \tag{7a}$$

$$\frac{y_{c_1}}{A_c} + \frac{y_{m_1}}{A_m} + \frac{y_{k_1}}{A_k} = 0 \tag{7b}$$

$$\frac{x_{c_2}}{A_c} + \frac{x_{m_2}}{A_m} + \frac{x_{k_2}}{A_k} = 0, \text{ and} \tag{7c}$$

$$\frac{y_{c_2}}{A_c} + \frac{y_{m_2}}{A_m} + \frac{y_{k_2}}{A_k} = 0. \tag{7d}$$

It should be appreciated that, if the respective spatial coordinate values $x_1$, $x_2$, and $y_1$, $y_2$ are integer values, the four equations, Eqs. (7a)–(7d), can be converted to:

$$A_m A_k x_{c_1} + A_c A_k x_{m_1} + A_c A_m x_{k_1} = 0, \tag{8a}$$

$$A_m A_k y_{c_1} + A_c A_k y_{m_1} + A_c A_m y_{k_1} = 0, \tag{8b}$$

$$A_m A_k x_{c_2} + A_c A_k x_{m_2} + A_c A_m x_{k_2} = 0, \text{ and} \tag{8c}$$

$$A_m A_k y_{c_2} + A_c A_k y_{m_2} + A_c A_m y_{k_2} = 0. \tag{8d}$$

Using Eq. (2b), the three areas, $A_c$, $A_m$ and $A_k$, in Eqs. (8a)–(8d) can be expressed as:

$$A_c = |x_{c_1} y_{c_2} - x_{c_2} y_{c_1}|, \tag{8e}$$

$$A_m = |x_{m_1} y_{m_2} - x_{m_2} y_{m_1}|, \text{ and} \tag{8f}$$

$$A_k = |x_{k_1} y_{k_2} - x_{k_2} y_{k_1}|. \tag{8g}$$

Eqs. (8a)–(8d) specify the spatial vector component relationships for a moiré-free condition and can be used, as described below, to determine the sizes and angles for corresponding halftone cells.

Although the analysis provided above assumes that the spatial coordinates x and y are integers, the moiré-free condition given by Eqs. (8a)–(8d) is true even if x and y are arbitrary real numbers. For example, a classical solution can be found if all single-cell halftone screens are square-shaped and the areas of these squares are the same, i.e., $A_c = A_m = A_k = a^2$, where a is the length of the side of the square. By setting a cyan halftone screen at 15°, a magenta halftone screen at 75° and a black halftone screen at 45°, the six spatial vectors, which satisfy the moiré-free condition specified by Eqs. (8a)–(8d), are:

$$V_{c_1}:(a \cdot \cos 15°, -a \cdot \sin 15°), V_{c_2}:(a \cdot \sin 15°, a \cdot \cos 15°), \tag{9a}$$

$$V_{m_1}:(-a \cdot \cos 75°, a \cdot \sin 75°), V_{m_2}:(-a \cdot \sin 75°, -a \cdot \cos 75°), \tag{9b}$$

$$V_{k_1}:(-a \cdot \cos 45°, -a \cdot \sin 45°), V_{k_2}:(a \cdot \sin 45°, -a \cdot \cos 45°) \tag{9c}$$

It is apparent from Eqs. (9a)–(9c) that the spatial vectors of the cyan ($V_{c_1}$, $V_{c_2}$) and magenta ($V_{m_1}$, $V_{m_2}$) halftone screens of this classical solution do not correspond to rational numbers and, therefore, the classical moiré-free solution cannot be accurately implemented in conventional digital halftoning. Although halftone screens with multiple clusters can use rational numbers for specifying spatial vectors, this approach results in some clusters having centers that do not lie directly on addressable points, i.e., do not lie on the pixel positions defined by the raster structure. Thus, the shape and center location varies from one cluster to another. Therefore, additional interference or moire between screen frequencies and the raster frequency may occur. Given that, for the moiré-free condition, there are only four equations, Eqs. (8a)–(8d), with twelve variables, according to the three color separations of cyan, magenta, and black, for example, and four spatial coordinates for each color of the color separations, the set of solutions become infinite if x and y are arbitrary real numbers.

However, if the spatial coordinates, x and y, are restricted to the set of integers, the set of solutions becomes finite and can be practically handled. In particular, for most digital halftoning applications, the number of possible sizes for each single-cell screen is generally less than a hundred or so. As a result, all possible solutions satisfying the moiré-free condition given by Eqs. (8a)–(8d) can be readily searched. Unfortunately, it is apparent that very few solutions can be found if all clusters are limited to solely square-shaped, integer-specified cells.

However, the range of possible solutions can be greatly increased by applying non-orthogonal or, such as, for example, parallelogram-shaped, single-cell halftone screens. For example, the following spatial vectors describe three parallelogram halftone cells in the cyan, magenta and black color separations:

$$V_{c_1}: (4, -2), \quad V_{c_2}: (1, 7), \tag{10a}$$

$$V_{m_1}: (-1, 7), \quad V_{m_2}: (-4, -2), \tag{10b}$$

$$V_{k_1}: (-3, -5), \quad V_{k_2}: (3, -5). \tag{10c}$$

It should be appreciated that the spatial domain representation of the above vectors of Eqs. (10a)–(10c) are very similar to the classical solution for a 600×1200 dpi printer:

| Cyan: | −75.96°, | 164.9 lpi and | 15.95°, | 145.6 lpi; | (11a) |
|---|---|---|---|---|---|
| Magenta: | −15.95°, | 145.6 lpi and | 75.96°, | 164.9 lpi; | (11b) |
| Black: | 50.2°, | 156.2 lpi and | −50.2°, | 156.2 lpi. | (11c) |

Therefore, it should be appreciated that at least substantially moiré-free halftone screens can be formed from non-orthogonal cluster cells to provide near classical moiré-free solutions.

Figure 5:
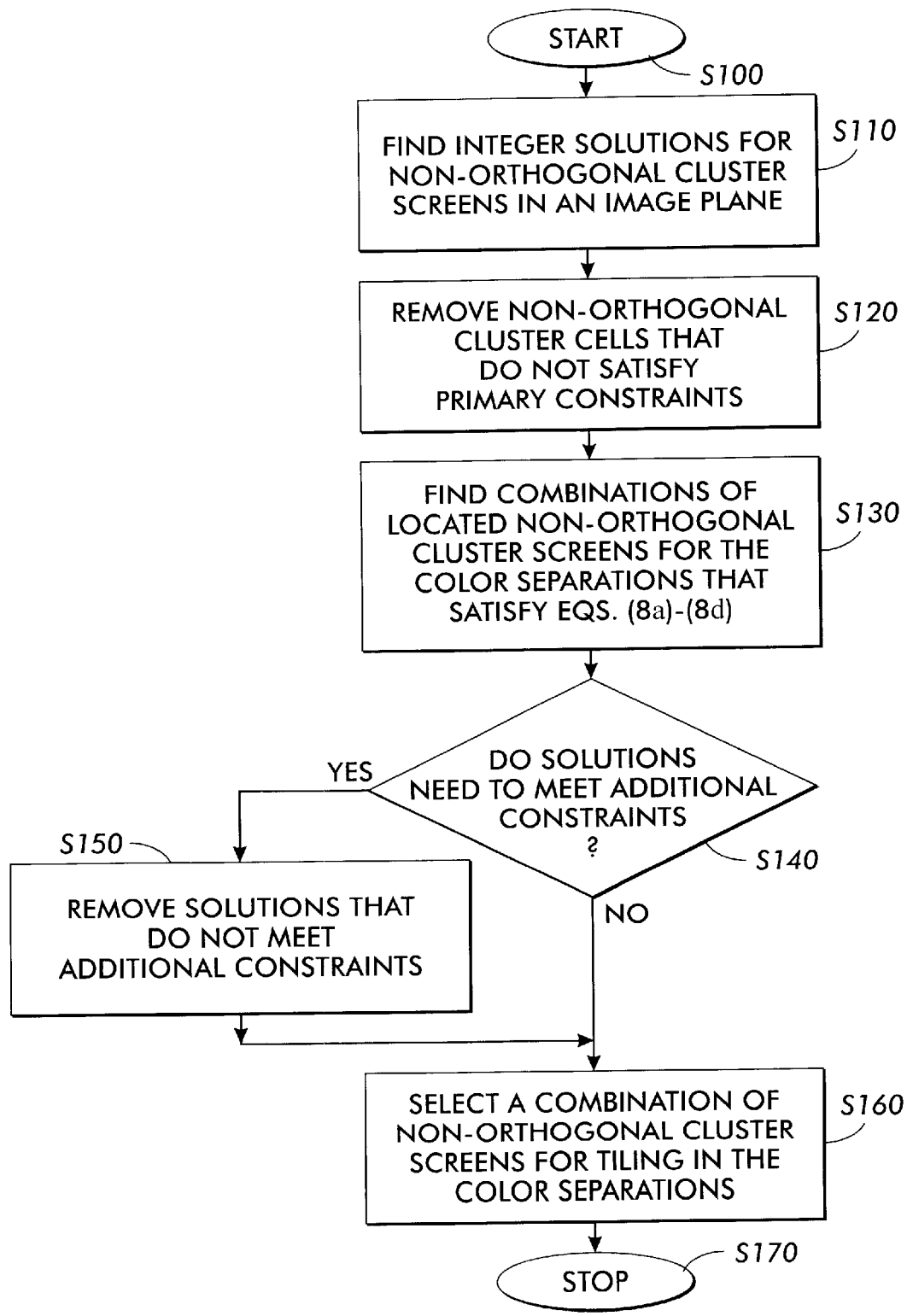
FIG. 5 is a flowchart outlining one exemplary embodiment of a method for determining a combination of non-orthogonal single-cell halftone screens according to this invention that will provide at least substantially moiré-free color halftoning.

Consequently, the substantially moiré-free halftone screens formed from non-orthogonal cluster cells can be used in a color halftone printing process. For, example, FIG. 5 is a flowchart outlining a first exemplary embodiment of a process, according to this invention, for determining a set of non-orthogonal halftone cluster screens for three color separations to perform substantially moiré-free color halftone printing.

Beginning in step S100, control proceeds to step S110, where all non-orthogonal halftone cluster cells having integer values for $x_1$, $y_1$, $x_2$ and $y_2$ are found. Then, in step S120, those non-orthogonal halftone cluster cells found in step S110 that do not satisfy one or more primary constraints, such as, for example, having an area that is smaller than a specified maximal area, $A_{max}$, are removed from the solutions set. In various exemplary embodiments, these primary constraints can include requiring the non-orthogonal halftone cluster cell to have both diagonals longer than all the sides of that non-orthogonal halftone cluster cell. Next, in step S130 combinations of any three remaining non-orthogonal halftone cluster cells that satisfy the three color moiré-free condition, defined in Eqs. (8a)–(8d), are identified. Control then continues to step S140.

In step S140, a determination is made whether any additional constraints are to be applied. Such additional constraints can contain, for example, frequency ranges, additional color moire constraints, printer limitations, etc. If no additional constraints are identified, the control jumps to step S160. Otherwise, if the identified combinations are required to meet at least one additional constraint, the control continues to step S150.

In step S150, those identified combinations of non-orthogonal halftone cluster cells that do not meet the additional constraints are removed from the identified combinations of non-orthogonal halftone cluster cells. Then, in step S160, one of the remaining combinations of non-orthogonal halftone cluster cells is selected and each of the various non-orthogonal halftone cluster cells of the selected combination are associated with one of the various color separations. The method then ends in step S170.

It should be appreciated that, while the above-outlined method has been described in terms of finding solutions to Eqs. (8a)–(8d), which describe four integer equations containing components corresponding to three separation colors, such as, for example, cyan, magenta, and black, it should be apparent that Eqs. (8a)–(8d) can be also used for any other color combinations. Further, Eqs. (8a)–(8d) can be expanded or reduced to include greater or lesser number of separation colors, as desired. Accordingly, combinations of more than or less than three non-orthogonal halftone cluster cells can be found in step S130 without departing from the spirit and scope of the invention. It is apparent that the above process may be readily implemented in software that can be used in a variety of hardware systems.

Figure 6:
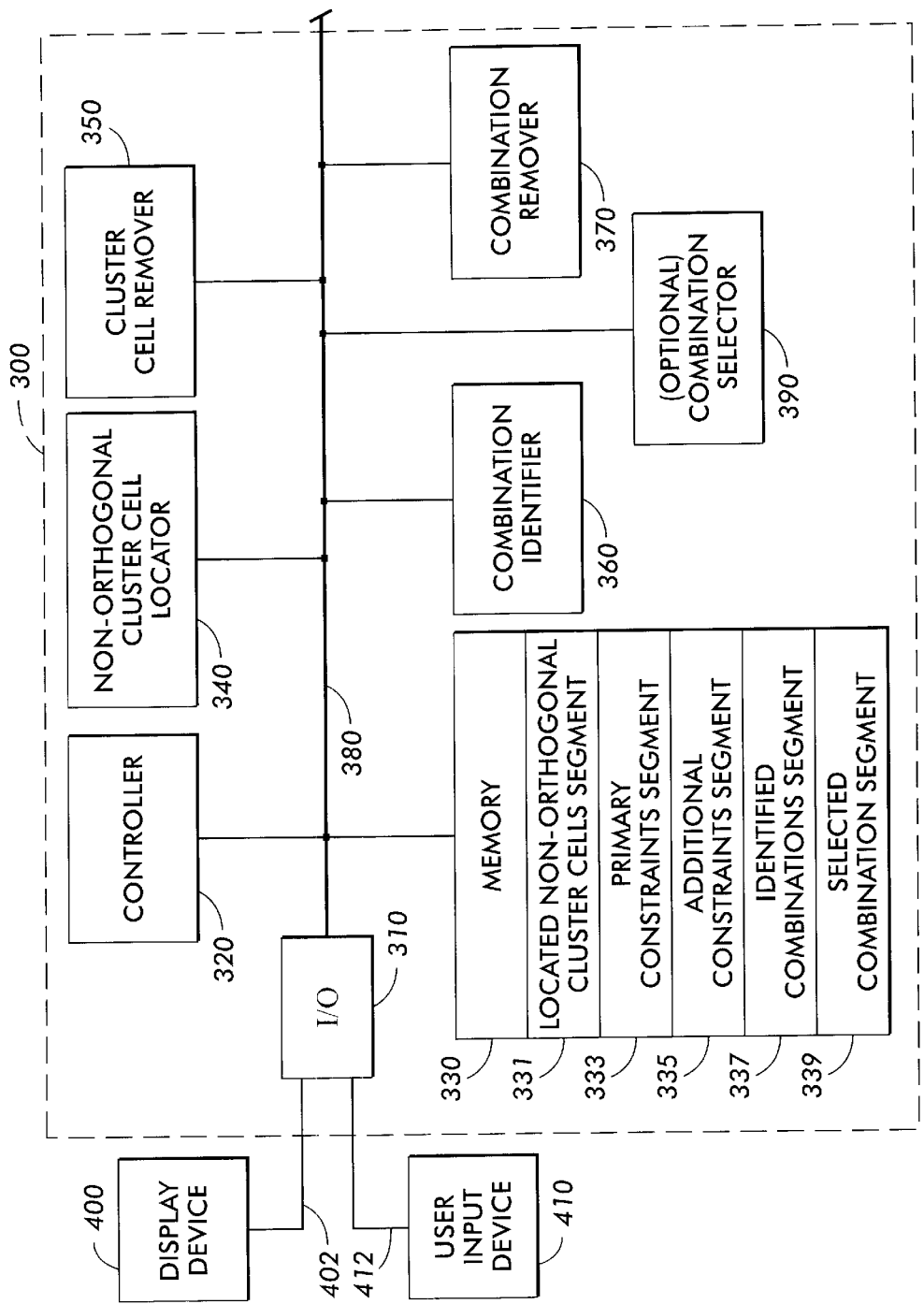
FIG. 6 is a block diagram of a system usable to generate a combination of non-orthogonal single-cell halftone screens according to this invention usable for substantially moiré-free color printing.

FIG. 6 illustrates one exemplary embodiment of a substantially moiré-free non-orthogonal halftone cluster screen generating system 300 according to this invention. As shown in FIG. 6, the substantially moiré-free non-orthogonal halftone cluster screen generating system 300 contains an input/output interface 310, a controller 320, a memory 330, a non-orthogonal cluster cell locator circuit, routine or agent 340, a cluster cell remover circuit, routine or agent 350, a combination identifier circuit, routine or agent 360, a combination remover circuit, routine or agent 370, and a control/data bus 380. The input/output interface 310 is connected to one or more display devices 410 and/or to one or more input devices 400.

The controller 320 may coordinate, individually or in the aggregate, other devices, shown or not shown, connected to the control/data bus 380. The control/data bus 380 may be any form of a communication bus, wired or wireless. It should be appreciated that the substantially moiré-free non-orthogonal halftone cluster screen generating system 300 may be implemented by one or more general or special purpose computers, programmed microprocessors or microcontrollers and peripheral integrated circuit elements, ASICS or other logic circuits such as discrete element circuits, programmable logic devices such as PLD, PLA, FPGA or the like. In general, any finite state machine that is capable of implementing the flowcharts of FIGS. 5 and/or 11 can be used to implement the substantially moiré-free halftone cluster generating system 300 according to this invention.

The memory 330 includes one or more of a located non-orthogonal cluster cell memory segment 331, a primary constraints memory segment 333, an additional constraints memory segment 335, an identified combinations memory segment 337, and a selected combinations memory segment 339. The memory 330 may additionally contain other segments for related or other purposes, as desired.

While the memory 330 is illustrated in FIG. 6 as being separate from the controller 320, it is apparent to one of ordinary skill that the memory 330 could be incorporated into the controller 320 to form a single device, for example, on-chip RAM, without departing from the spirit or scope of this invention. Similarly, each of the devices in the substantially moiré-free non-orthogonal halftone cluster screen generating system 300 may contain its own individual memory or controller.

In various exemplary embodiments, the non-orthogonal cluster cell locator circuit, routine or agent 330 searches and locates non-orthogonal cluster cells according to Eqs. (8a)–(8d). In various exemplary embodiments, the non-orthogonal cluster cell locator circuit, routine or agent 340 stores the located non-orthogonal cluster cells in the located non-orthogonal cluster cells segment 331 under control of the controller 320. The cluster cell remover circuit, routine or agent 350 removes cluster cells located by the non-orthogonal cluster cell locator 340 from the cluster cells stored in the located non-orthogonal cluster cells segment 331 based on the primary constraints stored in the primary constraints segment 333.

Alternatively, in various other exemplary embodiments, the non-orthogonal cluster cell locator circuit, routine or agent 340 supplies the located non-orthogonal cluster cells, whether under control of the controller 320 or not, directly to the cluster cell remover circuit, routine or agent 350. In this case, the cluster cell remover, routine or agent 350 determines which located non-orthogonal cluster cells satisfy the primary constraints stored in the primary constraints segment 333. Then, under control of the controller 320, the cluster cell remover circuit, routine or agent 350 either stores those located non-orthogonal cluster cells that meet the primary constraints stored in the located non-orthogonal cluster cells segment 331 or supplies them directly to the combination identifier circuit, routine or agent 360.

The combination identifier circuit, routine, or agent 360, under control of the controller 320, identifies combinations of located cluster cells that satisfy the moiré-free conditions described herein. For example, in various exemplary embodiments, the combination identifier circuit, routine or agent 360 identifies those combinations that satisfy Eqs. (8a)–(8d). In various other exemplary embodiments, the combination identifier circuit, routine or agent 360 identifies those combinations that satisfy the equations outlined below for combinations of cluster and line screens. The identified combinations may be determined according to the different color separations of the halftone screens. In various other exemplary embodiments, the combination identifier circuit, routine or agent 360 stores the identified combinations of the remaining located non-orthogonal cluster cells in the identified combinations segment 337, under control of the controller 320. The combination remover circuit, routine or agent 370, under control of the controller 320, removes certain combinations that do not satisfy the additional constraints, if any, that may be stored in the additional constraints segment 335.

Alternatively, in various other exemplary embodiments, if any additional constraints are provided by the user, the combination identifier circuit, routine or agent 360 directly supplies the identified combinations to the combination remover circuit, routine or agent 370.

In this case, if additional constraints are provided, the combination remover circuit, routine or agent 370 determines which identified combinations satisfy the additional constraints. Then, under control of the controller 320, the combination remover circuit, routine or agent 370 either stores the remaining identified combinations that meet the additional constraints stored in the identified combinations segment 337, or provides the remaining identified combinations to the user, or, if provided, to the combination selector circuit, routine or agent 390.

The identified combinations stored in the identified combinations segment 337 are then provided to the user to allow the user to select one of the identified combinations to be used to generate substantially moiré-free halftone images. Alternatively, in other various exemplary embodiments where the combination selector circuit, routine or agent 390 is implemented, the identified combinations are provided to the combination selector circuit, routine or agent 390, which selects one of the identified combinations to be used to generate substantially moiré-free halftone images. In either case, the selected combination is then stored in the selected combinations segment 339.

It should be further appreciated that any of the elements 310–390 of the substantially moiré-free non-orthogonal halftone cluster screen generating system 300 may access data and/or signals input from the one or more input devices 410 through the input/output interface 310. Similarly, any of the elements 310–390 of the substantially moiré-free non-orthogonal halftone cluster screen generating system 300 may output data and/or signals to the display device 400.

As shown in FIG. 6, the image display device 400 and the user input device 410 are connected over links 402 and 412, respectively, to the input/output interface 310 which is connected to the moiré-free non-orthogonal halftone cluster screen generating system 300 via the control/data bus 380. The links 402 and 412 may be any known or later developed system or devices for transmitting an electronic image or electronic information/data to and from the display device 400 to the input/output interface 310, or to and from the user input device to the input/output interface 310. The image display device 400 displays electronic image data generated by or for the moiré-free non-orthogonal halftone cluster screen generating system 300. The one or more user input devices 410 control the electronic image generated by the display device 400 and/or control the operation of the moiré-free non-orthogonal halftone cluster screen generating system 300. The image display device 400 and/or user input device 410 can be integrated with the moiré-free non-orthogonal halftone cluster screen generating system 300.

The above exemplary procedures for generating moiré-free non-orthogonal cell halftone screens, as illustrated in FIGS. 1–6, can be further supplemented by combining the above discussed non-orthogonal cell halftone screens with one or more line screens, as discussed below.

Figure 7:
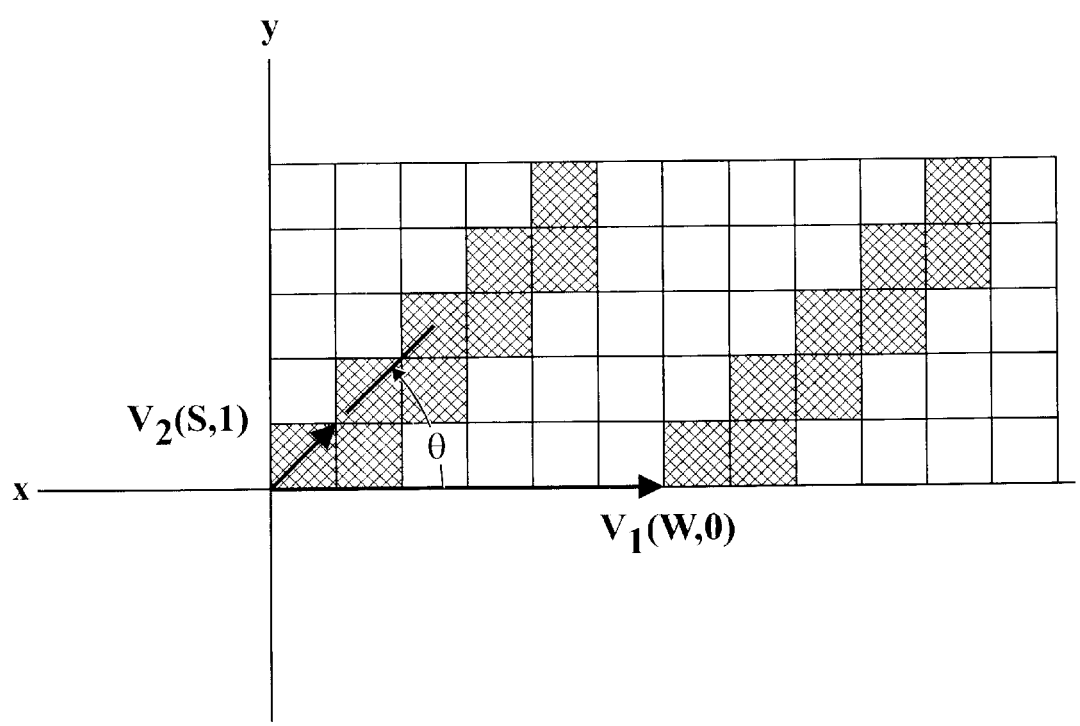
FIG. 7 illustrates a two-dimensional spatial vector representation of a line screen.

It is well understood in the halftone art that a line screen is considered a degenerate form of a halftone cell. That is, the spatial representation of a digital line screen can be given by two vectors, $V_1(W,0)$ and $V_2(S,1)$, as illustrated in FIG. 7, or as expressed in their spatial components as:

$$x_1 = W, \qquad (12a)$$

$$y_1 = 0, \qquad (12b)$$

$$x_2 = S, \qquad (12c)$$

$$\text{and } y_2 = 1 \qquad (12d)$$

where,

W represents the width of the line;

1 represents a default height of the line; and

S determines the tilt angle of the line from the y-axis.

The area A of the line segment specified by $V_1$ and $V_2$ given by Eqs. (12a)–(12d) can be calculated using Eq. (2b), to arrive at:

$$A = W. \qquad (13)$$

Figure 8:
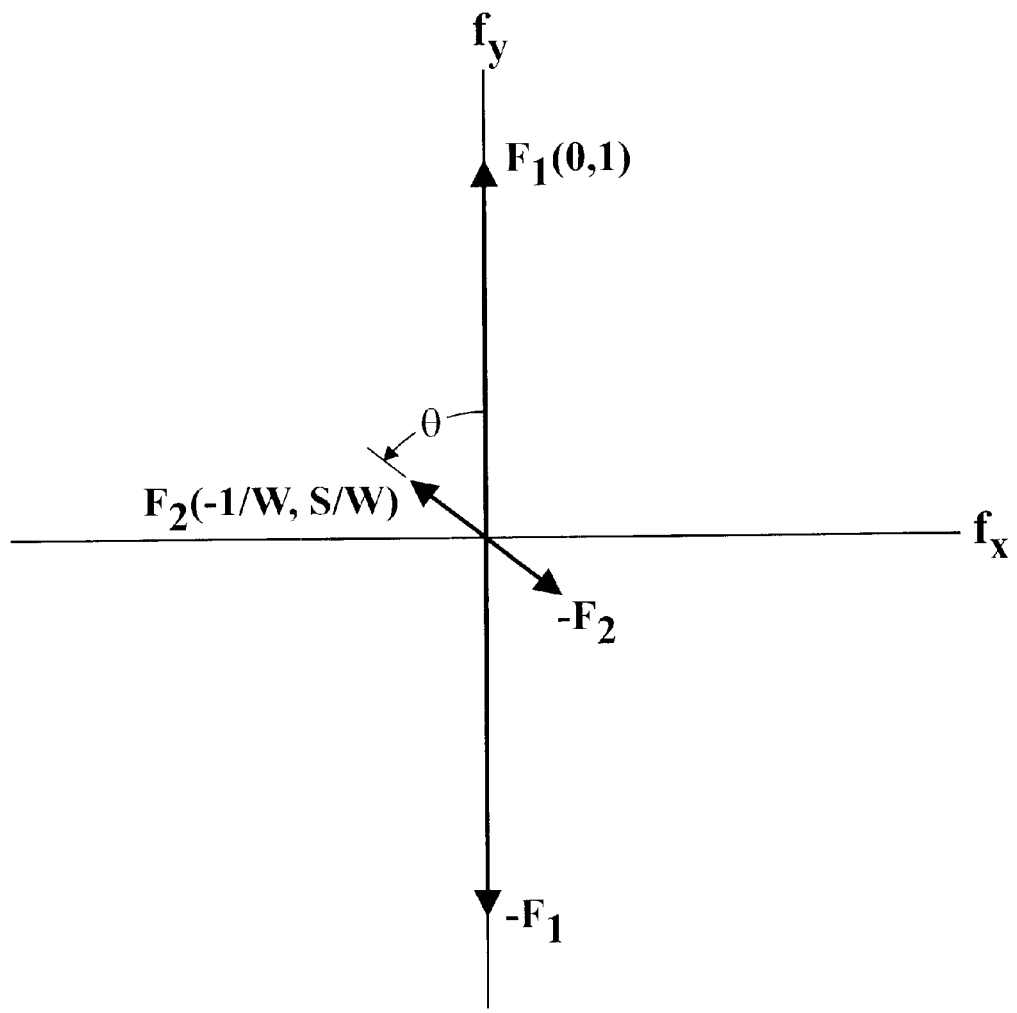
FIG. 8 illustrates a frequency domain representation of the line screens shown in FIG. 7.

FIG. 8 illustrates the vectors $F_1$ and $F_2$, in the frequency domain, that represent the line screen shown in FIG. 7. Using the relationships provided in Eqs. (4a) and (4b), the frequency components of $F_1$ and $F_2$ can be calculated to arrive at the following result:

$$f_{x_1}=0, \tag{14a}$$

$$f_{y_1}=1, \tag{14b}$$

$$f_{x_2}=-1/W, \tag{14c}$$

$$f_{y_2}=S/W. \tag{14d}$$

It can be seen from FIG. 8 that the vector $F_1$ (0,1) is a frequency vector that lies on the y-axis and has the highest frequency possible, i.e., 1/pixel, which, according to sampling theory, corresponds to a zero frequency in the frequency domain representation. In other words, the frequency representation of a line screen can be simply represented by the sole vector $F_2$. Therefore, the three-color moiré-free condition specified by the two Eqs. (5a) and (5b) can be reduced to one equation, if one line screen is used to replace a non-orthogonal cluster screen. For example, if it is assumed that the sole frequency vector of a cyan line screen is given by $F_{c_2}$, then the vector relationship for the three-color moiré-free condition for a combination of this line screen, $F_{c_2}$, with two other, for example, magenta and black, non-orthogonal cluster screens, $F_{m_1}$ and $F_{m_2}$, and $F_{k_1}$ and $F_{k_2}$, respectively, can be rewritten as follows:

$$F_{c_2}+F_{m_2}+F_{k_2}=0 \tag{15}$$

It is apparent that the above-outlined moiré-free condition in Eq. (15) is unchanged even if several single-cell cluster screens are replaced by line screens.

Further, the moiré-free condition specified by the vector equation, Eq.(15), can also be expressed by two scalar equations, which are identical to Eqs. (8c) and (8d) and rewritten below as:

$$A_m A_k x_{c2}+A_c A_k x_{m2}+A_c A_m x_{k2}=0, \text{ and} \tag{8c}$$

$$A_m A_k y_{c2}+A_c A_k y_{m2}+A_c A_m y_{k2}=0, \tag{8d}$$

where the areas $A_c$, $A_m$ and $A_k$ are given by Eqs. (8e)–(8g).

In the above-outlined discussion, the line screen defined by the two vectors, $V_1(W,0)$ and $V_2(S,1)$, represents a set of line screens, which are tilted from the y-axis. It should be appreciated that another set of line screens, which are tilted from the x-axis, can be defined by two vectors, $V_1(0,W)$ and $V_2(1,S)$ and can be equally applied in the above-outlined equations.

It is readily apparent that the moiré-free condition, specified by the vector equation, Eq. (15), and the two scalar equations, Eqs. (8c) and (8d), can be applied to any combination of non-orthogonal cluster screens that includes one or more line screens.

Figure 9:
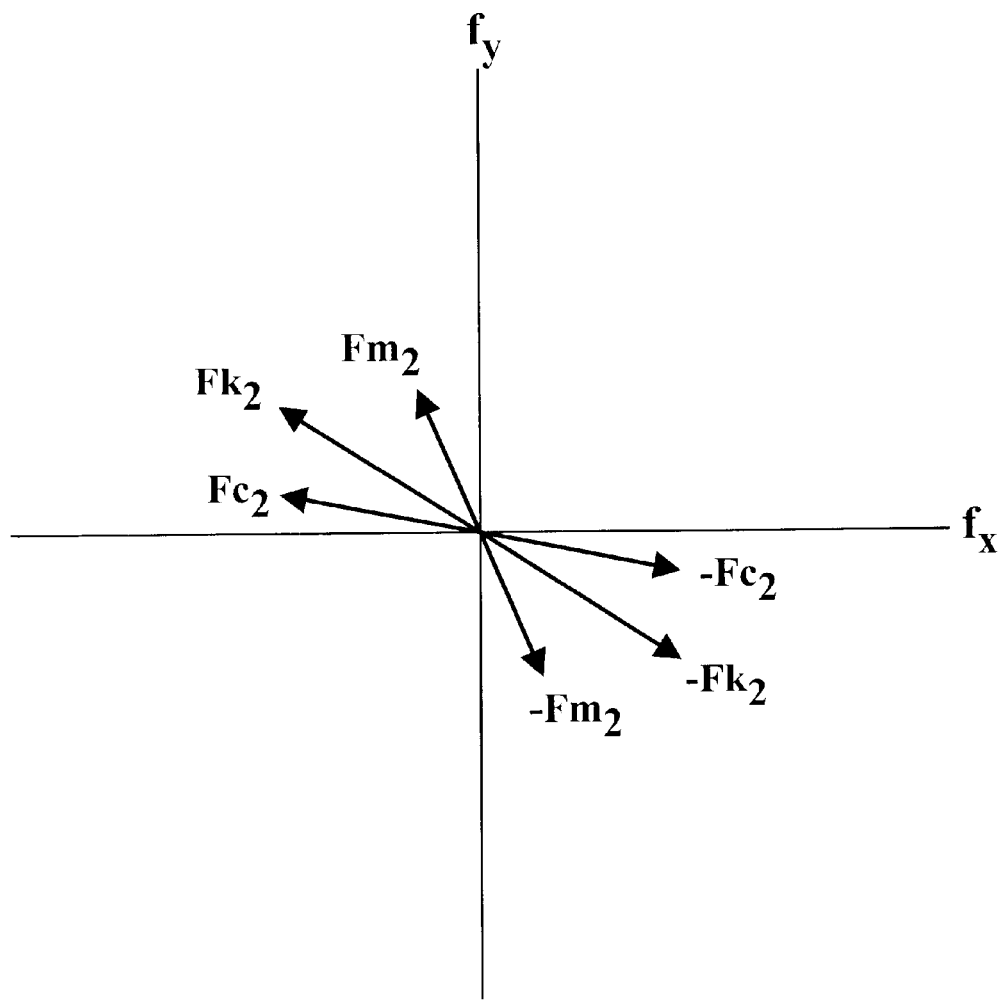
FIG. 9 illustrates a frequency domain representation of the non-zero frequency vectors for three line screens.

FIG. 9 provides, for example, a vector diagram of three line screens in the frequency domain, corresponding to the $F_{c_2}$, $F_{m_2}$, and $F_{k_2}$ vectors of Eq. (15). It is apparent that, similarly to the analysis previously discussed for non-orthogonal cluster screens, the line screens and non-orthogonal cluster screens corresponding to the solutions for Eqs. (15), (8c) and (8d) can also be used to provide moiré-free halftoning.

Figure 10:
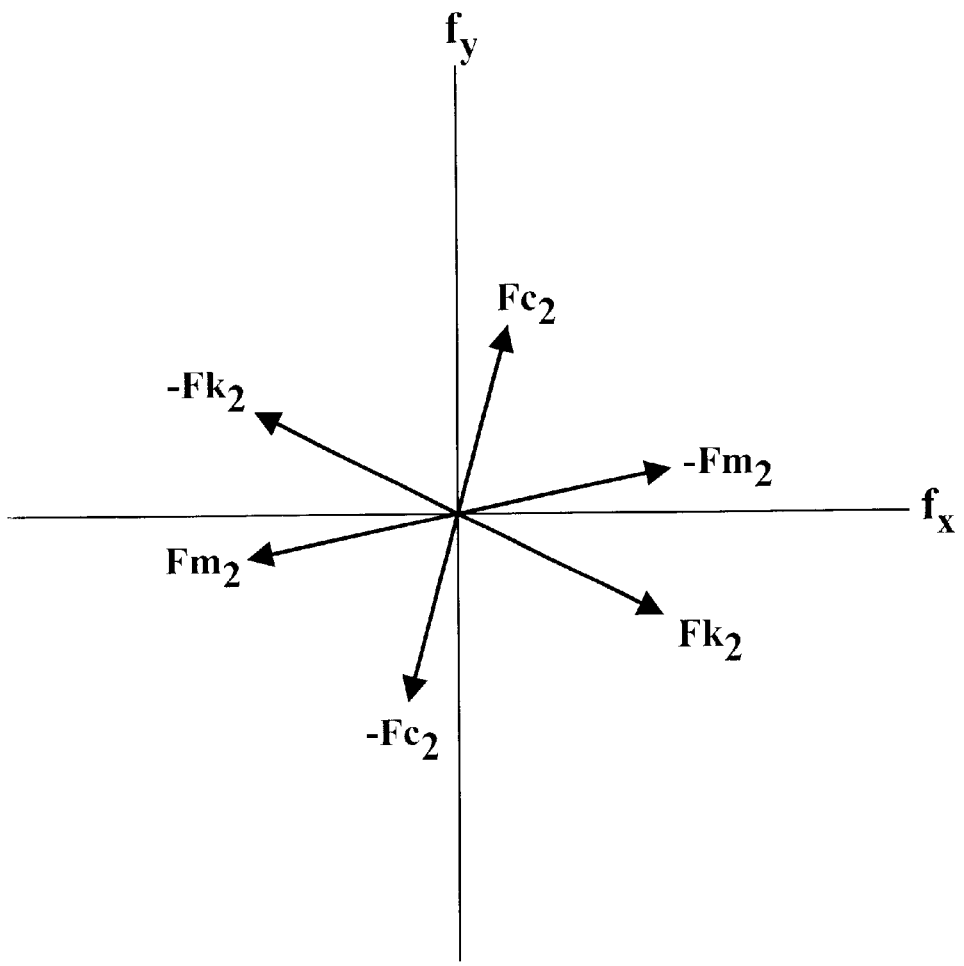
FIG. 10 illustrates a frequency domain representation of a combination of two single-cell halftone screens and a line screen according to an exemplary embodiment of this invention.

FIG. 10 illustrates, in the frequency domain, a moiré-free condition corresponding to Eq. (15) for an exemplary combination of a line screen in a cyan ($F_{c_1}$ and $F_{c_2}$) color separation and two cluster screens in the magenta ($F_{m_1}$ and $F_{m_2}$) and black ($F_{k_1}$ and $F_{k_2}$) color separations, respectively. The exemplary arrangement of line screen and cluster screens frequency vectors in FIG. 10 can be contrasted to FIG. 4, which illustrates in the frequency domain the exemplary moiré-free conditions for the all-cluster screen case.

It is apparent that even if only one line screen is combined with two other parallelogram cluster screens, the moiré-free conditions can be reduced to one vector equation, Eq. (15). Therefore, the combination of line screens and non-orthogonal cluster screens provides extra degrees of freedom in selecting suitable screen solutions.

Figure 11:
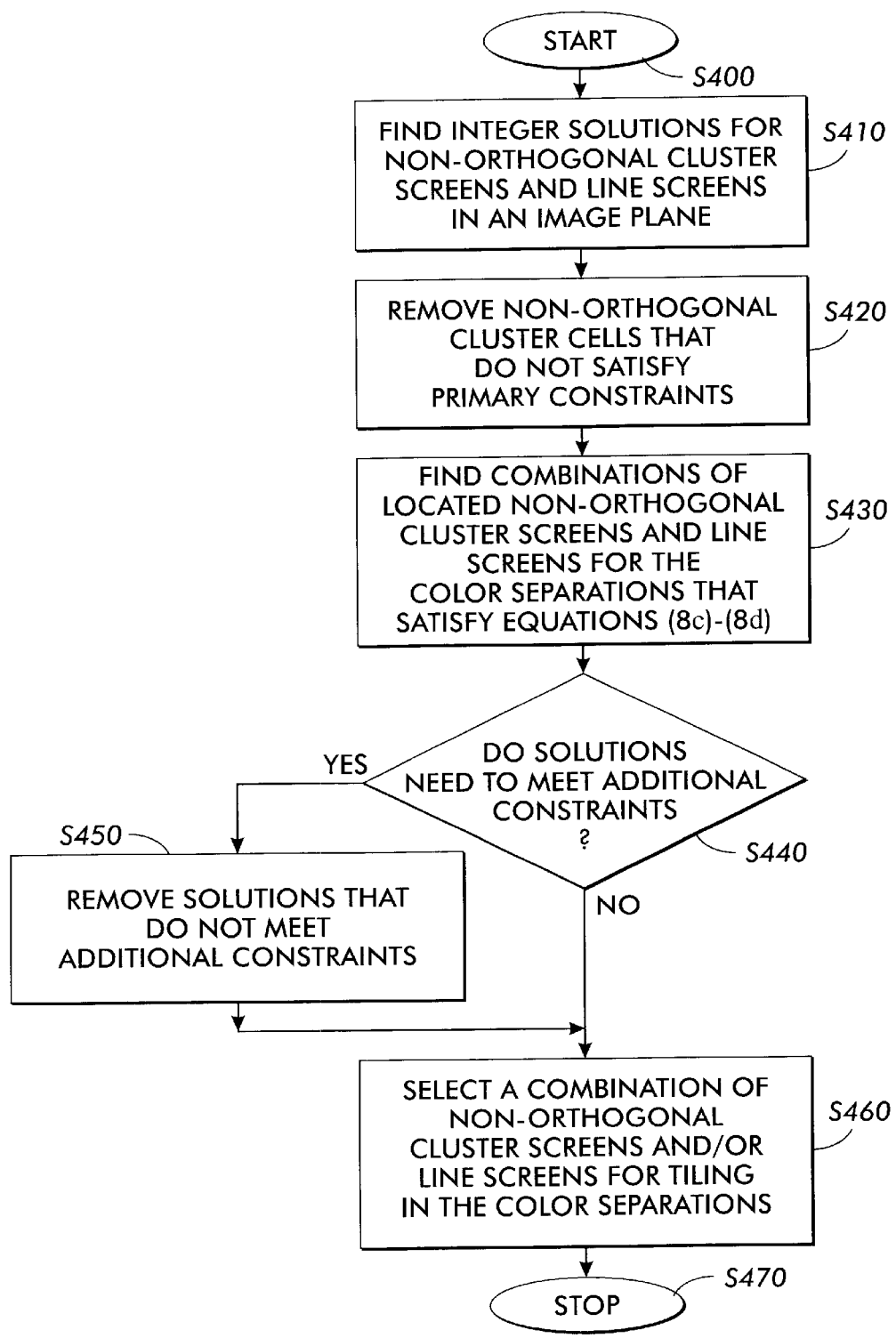
FIG. 11 is a flowchart outlining one exemplary embodiment of a method for determining a combination of non-orthogonal cluster screens and line screens according to this invention that provide at least substantially moiré-free color halftoning.

FIG. 11 is a flowchart outlining an exemplary embodiment of a process, according to this invention, for combining non-orthogonal single-cell cluster screens with line screens to form substantially moiré-free halftoning.

Beginning in step S400, control proceeds to step S410, where all non-orthogonal halftone cluster cells having integer values for $x_1$, $y_1$, $x_2$ and $y_2$ are found. As line screens can be treated as special cases of non-orthogonal parallelograms, i.e., degenerate parallelograms, all possible line screens solutions can also be obtained from the non-orthogonal halftone cluster cells found in step S410. Of course, for non-orthogonal cells, the analysis includes calculation on both frequency components (e.g., $F_1$ and $F_2$). In step S420, those non-orthogonal halftone cluster cells found in step S410 that do not satisfy one or more primary constraints are removed from the solutions set. In various exemplary embodiments, these primary constraints can include requiring a non-orthogonal halftone cluster cell to have both diagonals longer than all the sides of that non-orthogonal halftone cluster cell. Next, in step S430, any combinations of non-orthogonal halftone cluster screens and line screens that satisfy integer equations (8c) and (8d) are identified. Control then continues to step S440.

In step S440, a determination is made whether any additional constraints are to be applied. Such additional constraints can contain, for example, frequency ranges, multi-color moire constraints, printer limitations, etc. If no additional constraints are identified, control jumps to step S460. Otherwise, if the identified combinations are required to meet at least one additional constraint, control continues to step S450.

In step S450, those identified combinations of non-orthogonal cells that do not meet the additional constraints are removed from the identified combinations of non-orthogonal cells. Then, in step S460, one of the remaining combinations of non-orthogonal halftone cluster cells and line screen cells is selected and each of the various halftone screens is associated with each of the color separations. The method then ends in step S470. It is apparent that the above-outlined method may be readily implemented in software that can be used in a variety of hardware systems.

It should be appreciated that the above-outlined exemplary procedures can be modified with many different alternatives or variations as apparent to those skilled in the art. For example, other constraints in addition to cell size may be used. Likewise, the solution sets may be sorted or further constrained according to size, positioning, angles, hardware characteristics, or the like.

It should be appreciated that, while the exemplary embodiments of this invention include various primary and additional constraints, it should be apparent that the primary and/or the additional constraints may include the null set. That is, various exemplary embodiments of this invention may identify and/or select combinations of non-orthogonal cluster cells or line screens without applying any primary constraints and/or additional constraints, as desired.

The above-outlined process is described in terms of finding solutions to Eqs. (8c) and (8d), which describe a set of equations where the components of the solutions are differentiated according the different separation colors of cyan, magenta, yellow, and black, for example. However, it should be apparent that Eqs. (8c) and (8d) can be expanded or reduced to include greater or lesser number of separation colors, as desired. Accordingly, solutions and combinations of more than or less than the set of parallelograms and/or line screens corresponding to the number of color separations can be found in step S410 without departing from the spirit and scope of the invention.

It should be further appreciated that the above-outlined method for combining line screens with non-orthogonal halftone cluster cell screens can be readily incorporated into the moiré-free non-orthogonal halftone cluster screen generating system 300 system of FIG. 6. For example, the non-orthogonal cluster cell locator circuit, routine or agent 340 may also locate line screens. Further, the combination identifier circuit, routine or agent 360 may determine combinations including line screens, for example. Thus, it is apparent that system of FIG. 6 may be readily modified to operate according to the method outlined in FIG. 11.

As an example of the exemplary method of FIG. 11, two non-orthogonal parallelogram halftone cells for the cyan and magenta color separations, and one halftone line screen for the black color separation, can be combined for at least substantially moiré-free three-color halftoning. With a 600× 600 dpi printer, the systems and/or methods according to this invention provide the following halftone results:

$$\text{Cyan: 145.7 lpi at 11.3° and 117.8 lpi at } -76°; \tag{16}$$

$$\text{Magenta: 145.7 lpi at 78.7°; and 117.8 lpi at } -14°;$$

$$\text{Black: 121.2 lpi at 45°.}$$

The equivalent halftone parallelogram/line screen structures are given by:

$$V_{c_1}:(5,1), V_{c_2}:(1,-4), \tag{17}$$

$$V_{m_1}:(1,5), V_{m_2}:(-4,1),$$

$$V_{k_1}:(7,0), V_{k_2}:(1,1).$$

Figure 12:
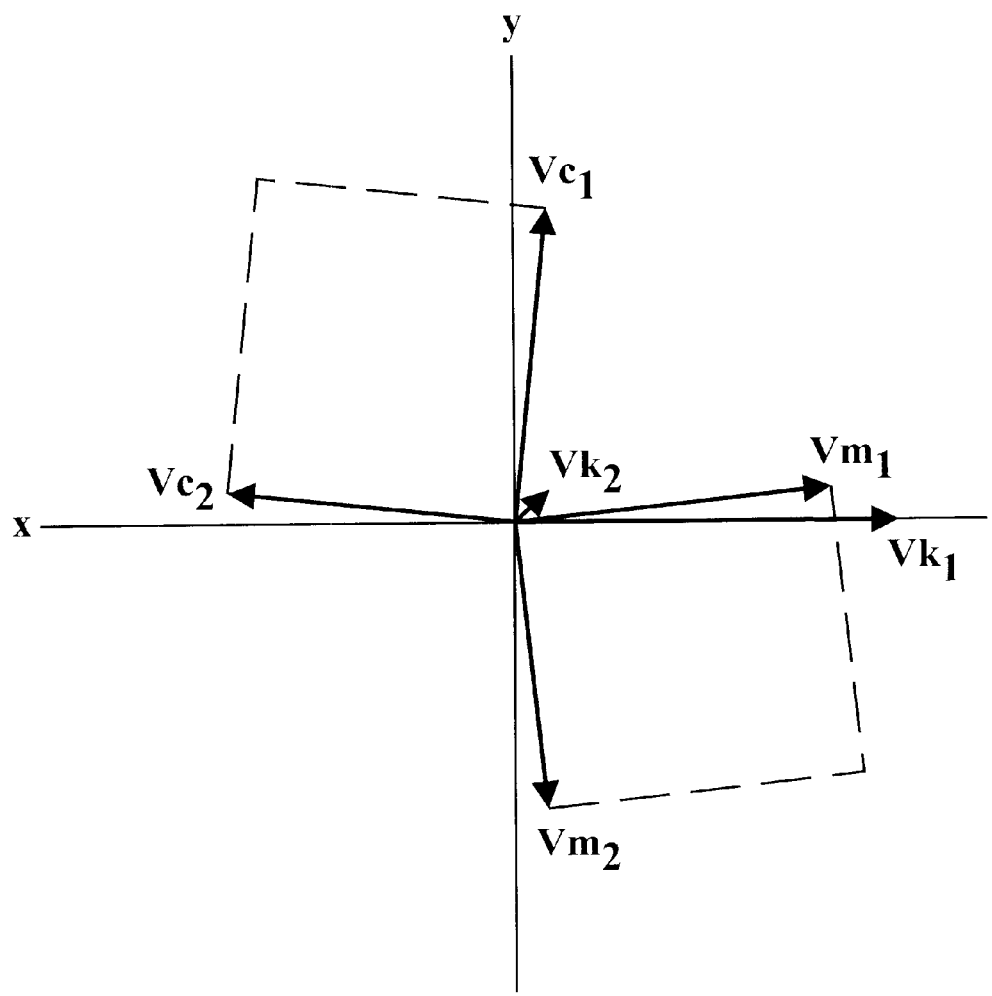
FIG. 12 illustrates a spatial domain representation of a combination of non-orthogonal parallelogram cells and line screens according to an exemplary embodiment of this invention.

FIG. 12 illustrates, in the spatial domain, the relationships of Eq. (17) according to an exemplary embodiment of this invention. It should be appreciated from FIG. 12, that the cyan-magenta-black combination satisfies the zero moire condition defined by Eqs. (8c), (8d) and Eq. (15).

Figure 13:
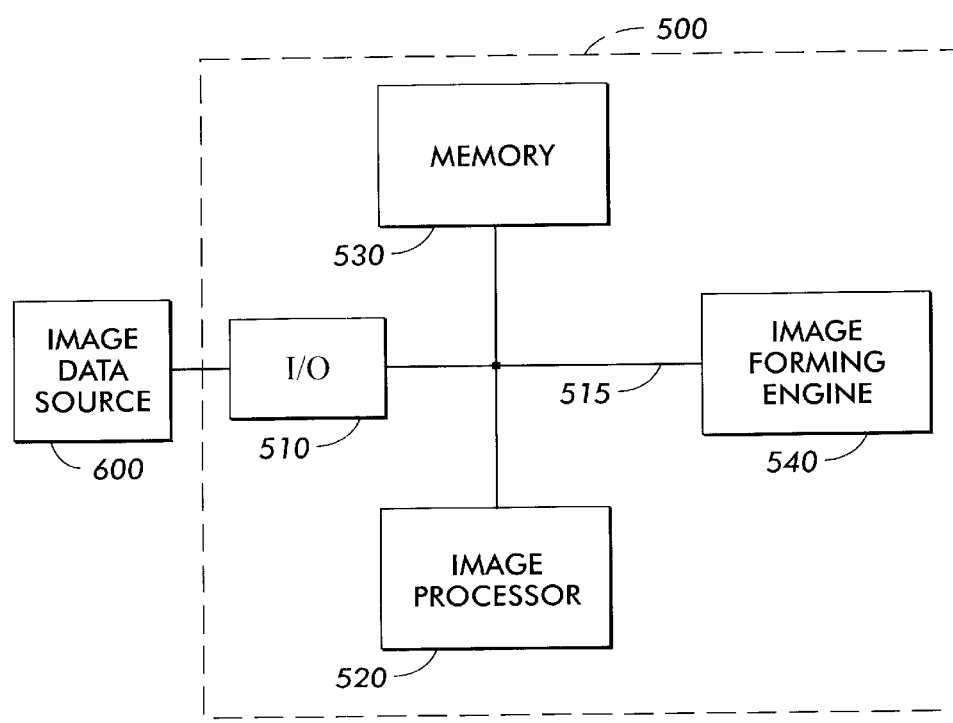
FIG. 13 is a block diagram of an exemplary halftone printing system that uses an exemplary embodiment of a combination of halftone screens according to this invention to form a substantially moiré-free halftone image.

FIG. 13 is a block diagram of one exemplary embodiment of a color halftoning printing system 500 suitable for halftoning images using the substantially moiré-free non-orthogonal cluster screens or combined substantially moiré-free non-orthogonal clusters and substantially moiré-free line screens according to this invention. The color halftoned image printing system 500 contains an input/output interface 510, an image processor 520, a memory 530, and an image forming engine 540, each connected to a control/data bus 515. Image data containing at least one continuous tone region and received from an image data source 600 is transferred to the memory 530 via the input/output interface 510 under the direction of the image processor 520.

The image processor 520 uses the selected non-orthogonal cluster and/or line screens for the different color separations, selected according to one of the exemplary embodiments outlined above, to convert the continuous tone image data received from the image data source 600 to binary raster data. The image processor 520 uses the memory 530 to store the image data and/or instructions for processing the image data. After using the selected non-orthogonal and/or line screens to convert at least the continuous tone portions of the image data to halftoned raster data, the image processor 520, via the control/data bus 515, sends control and raster data signals to the image forming engine 540 to print a halftone version of the image data received from the image data source 600. Because the image processor 520 used the non-orthogonal halftone screens selected according to this invention to generate the halftoned raster data, the resulting halftone image is substantially moiré-free. The image forming engine 540 may be a laser or ink-jet printer, a digital copier, a facsimile device, a computer with a built-in printer, or any other device that is capable of producing a hard copy image output based on halftone raster data.

It should be appreciated that the image processor 520 may be one or more general or special purpose computers, programmed microprocessors or microcontrollers and peripheral integrated circuit elements, ASIC or other logic circuits such as discrete element circuits, programmable logic devices such as PLD, PLA, FPGA or the like.

It should be also appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 600 is thus any known or later developed system or device for generating, storing and/or transmitting the electronic image data to the color halftoning printing system 500.

While the color halftoning printing system 500 shown in FIG. 13 contains several distinct components, it should be appreciated that each of these components may be combined in a device or system that performs all the functions of the individual components. Similarly, it is appreciated that the color halftoning printing system 500 may contain less than all the components illustrated in FIG. 13 without departing from the spirit and scope of this invention. For example, a color halftoning printing system may also contain a monitor, if desired. Also, the image processor 520 may possess supporting hardware or devices such as additional memory, a communication path, I/O devices, etc., without departing from the spirit and scope of this invention. Accordingly, the systems and methods according to this invention allow more degrees of freedom for moiré-free color halftoning than were previously available when selecting the cluster and/or line screens to be used when halftoning the various color separations.

Though the above exemplary procedures describe solution sets according to the moiré-free equations described above, it is apparent that equally desirable solution sets can be found by replacing the right hand side of the moiré-free equations with an arbitrarily small number or by suitably altering the quantity or expression of the parameters of the moiré-free equations without departing from the spirit and scope of this invention. Further, while the exemplary embodiments describe solutions for the color separations of cyan, magenta, and black, other colors or combinations of colors, as desired, can be substituted. Also, more or less than three color separations can be utilized as desired.

Further, while the exemplary embodiments refer to solution sets as principally containing non-orthogonal, parallelogram-shaped cluster cells, it should be appreciated that the exemplary embodiments according to this invention can also be applied to non-parallelogram shaped dots. For example, squares, rectangles, triangles, ellipses, oblate or prolate shapes, trapezoidal shapes or the like, where the outer boundary of the respective shape is substantially contained within the angles formed by the representative halftone cell vectors, can be used. Therefore, it should be appreciated that various exemplary embodiments of this invention can suitably generate and/or use combinations of various at least substantially moiré-free cluster cells whose halftone dot boundaries can be substantially defined by the respective spatial or frequency domain vectors. It is evident that many alternatives, modifications, or variations of the cell types and procedures for combining various cell types for satisfying the moiré-free conditions are apparent to those skilled in the art. Accordingly, various changes may be made without departing from the spirit and scope of the invention.

What is claimed is:

1. A method of generating a plurality of non-orthogonal halftone screens for substantially moiré-free color halftoning, comprising:

locating non-orthogonal halftone cells substantially specified by two spatial vectors $(x_{n_1}, y_{n_1})$ and $(x_{n_2}, y_{n_2})$ that substantially form a non-orthogonal halftone cell, where, $x_{n_1}$, $y_{n_1}$ and $x_{n_2}$, $y_{n_2}$ are substantially integer valued;

identifying combinations of the located non-orthogonal halftone cells, suitable for tiling an image plane, of at least three of the located non-orthogonal halftone cells, where the spatial vectors of the identified combinations satisfy:

$$A_b A_c x_{a_1} + A_c A_a x_{b_1} + A_a A_b x_{c_1} \cong 0,$$

$$A_b A_c y_{a_1} + A_c A_a y_{b_1} + A_a A_b y_{c_1} \cong 0,$$

$$A_b A_c x_{a_2} + A_c A_a x_{b_2} + A_a A_b x_{c_2} \cong 0, \text{ and}$$

$$A_b A_c y_{a_2} + A_c A_a y_{b_2} + A_a A_b y_{c_2} \cong 0,$$

where,
the subscripts 1 and 2 are arbitrary and interchangeable,
n=a, b, c, where,
a, b, c are arbitrary color indices; and
$A_n = |x_{n_1} y_{n_2} - x_{n_2} y_{n_1}|;$
selecting one of the identified combinations; and
associating each non-orthogonal halftone cell of the selected identified combination with one or more color separations of a color halftone printer.

2. The method according to claim 1, wherein non-orthogonal includes cell shapes containing right angles.

3. The method according to claim 1, further comprising:
applying constraints to the located non-orthogonal halftone cells; and
removing non-orthogonal halftone cells that do not satisfy the constraints from the located non-orthogonal halftone cells.

4. The method according to claim 3, further comprising:
applying constraints to the identified combinations of non-orthogonal halftone cells; and
removing combinations of non-orthogonal halftone cells that do not satisfy the constraints from the identified combinations of non-orthogonal halftone cells.

5. The method according to claim 1, further comprising:
applying constraints to the identified combinations of non-orthogonal halftone cells; and
removing combinations of non-orthogonal halftone cells that do not satisfy the constraints from the identified combinations of non-orthogonal halftone cells.

6. The method according to claim 1, wherein, the identifying combinations step, identifies less than three of the located non-orthogonal halftone cells.

7. A method of generating a plurality of non-orthogonal halftone screens for substantially moiré-free color halftoning, comprising:

locating non-orthogonal halftone cells substantially specified by two spatial vectors $(x_{n_1}, y_{n_1})$ and $(x_{n_2}, y_{n_2})$ that substantially form a non-orthogonal halftone cell, where, $x_{n_1}$, $y_{n_1}$ and $x_{n_2}$, $y_{n_2}$ are substantially integer valued;

locating halftone line screens substantially specified by two spatial vectors $(x_{m_1}, y_{m_1})$ and $(x_{m_2}, y_{m_2})$ that substantially form a halftone line screen, where, $x_{m_1}$, $y_{m_1}$ and $x_{m_2}$, $y_{m_2}$ are substantially integer valued while satisfying:
either $y_{m_1}=0$ and $y_{m_2}=1$,
or $x_{m_1}=0$ and $x_{m_2}=1$;

identifying combinations of the located non-orthogonal halftone cells and at least one of the located halftone line screens, suitable for tiling an image plane, of at least three of the located non-orthogonal halftone cells and line screens where the spatial vectors of the identified combinations satisfy:

$$A_b A_c x_{a_2} + A_c A_a x_{b_2} + A_a A_b x_{c_2} \cong 0, \text{ and}$$

$$A_b A_c y_{a_2} + A_c A_a y_{b_2} + A_a A_b y_{c_2} \cong 0,$$

where,
the subscripts 1 and 2 are arbitrary and interchangeable;
n=a, b, c,
m=a, b, c, where,
a, b, c are arbitrary color indices; and
$A_n = |x_{n_1} y_{n_2} - x_{n_2} y_{n_1}|;$
selecting one of the identified combinations; and
associating each non-orthogonal halftone cell or line screen of the selected identified combination with one or more color separations of a color halftone printer.

8. The method according to claim 7, wherein non-orthogonal includes cell shapes containing right angles.

9. The method according to claim 7, further comprising:
applying constraints to the located non-orthogonal halftone cells; and
removing non-orthogonal halftone cells that do not satisfy the constraints from the located non-orthogonal halftone cells.

10. The method according to claim 9, further comprising:
applying constraints to the identified combinations of non-orthogonal halftone cells; and
removing combinations of non-orthogonal halftone cells that do not satisfy the constraints from the identified combinations of non-orthogonal halftone cells.

11. The method according to claim 7, further comprising:
applying constraints to the identified combinations of non-orthogonal halftone cells; and
removing combinations of non-orthogonal halftone cells that do not satisfy the constraints from the identified combinations of non-orthogonal halftone cells.

12. The method according to claim 7, wherein, the identifying combinations step, identifies less than three of the located non-orthogonal halftone cells and located line screens.

13. An apparatus for generating non-orthogonal halftone screens for substantially moiré-free color halftoning, comprising:

a non-orthogonal halftone cell locating circuit, routine or agent that locates substantially non-orthogonal halftone cells that are substantially specified by two spatial vectors $(x_{n_1}, y_{n_1})$ and $(x_{n_2}, y_{n_2})$ where, $x_{n_1}, y_{n_1}$ and $x_{n_2}, y_{n_2}$ are substantially integer valued;

a non-orthogonal halftone cell combination identifying circuit, routine or agent that identifies combinations, suitable for tiling an image plane, of at least three of the located non-orthogonal halftone cells where the spatial vectors of the identified combinations satisfy:

$$A_b A_c x_{a_1} + A_c A_a x_{b_1} + A_a A_b x_{c_1} \cong 0,$$

$$A_b A_c y_{a_1} + A_c A_a y_{b_1} + A_a A_b y_{c_1} \cong 0,$$

$$A_b A_c x_{a_2} + A_c A_a x_{b_2} + A_a A_b x_{c_2} \cong 0, \text{ and}$$

$$A_b A_c y_{a_2} + A_c A_a y_{b_2} + A_a A_b y_{c_2} \cong 0,$$

where, the subscripts 1 and 2 are arbitrary and interchangeable, n=a, b, c, where, a, b, c are arbitrary color indices; and $A_n = |x_{n_1} y_{n_2} - x_{n_2} y_{n_1}|$;

a non-orthogonal halftone cell selector circuit, routine or agent that selects one of the identified combinations of halftone cells;

wherein each non-orthogonal halftone cell of the selected combination is associated with one color separation of a color halftone printer.

14. The apparatus according to claim 13, wherein non-orthogonal includes cell shapes containing right angles.

15. The apparatus according to claim 13, further comprising:

a located non-orthogonal halftone cell removing circuit, routing or agent that removes located non-orthogonal cells according to a set of locating constraints.

16. The apparatus according to claim 15, further comprising:

a non-orthogonal halftone cell combination removing circuit, routine or agent that removes non-orthogonal halftone cell combinations according to a set of combination removing constraints.

17. The apparatus according to claim 13, further comprising:

a non-orthogonal halftone cell combination removing circuit, routine or agent that removes non-orthogonal halftone cell combinations according to a set of combination removing constraints.

18. The apparatus according to claim 13, wherein the non-orthogonal halftone cell combination identifying circuit, routine or agent identifies less than three non-orthogonal halftone cells of the located non-orthogonal halftone cells.

19. The apparatus according to claim 13, wherein the non-orthogonal halftone cell locating circuit, routine or agent also locates line screens substantially specified by two spatial vectors $(x_{m_1}, y_{m_1})$ and $(x_{m_2}, y_{m_2})$ that substantially form a halftone line screen, where, $x_{m_1}, y_{m_1}$ and $y_{m_2}, y_{m_2}$ are substantially integers while satisfying:

either $y_{m_1}=0$ and $y_{m_2}=1$, or $x_{m_1}=0$ and $x_{m_2}=1$, where, m=a, b, c;

the non-orthogonal halftone cell combination identifying circuit, routine or agent identifies combinations of the located non-orthogonal halftone cells and at least one of the located halftone line screens, suitable for tiling an image plane, of at least three of the located non-orthogonal halftone cells and line screens where the spatial vectors of the identified combinations satisfy:

$$A_b A_c x_{a_2} + A_c A_a x_{b_2} + A_a A_b x_{c_2} \cong 0,$$

$$A_b A_c y_{a_2} + A_c A_a y_{b_2} + A_a A_b y_{c_2} \cong 0; \text{ and}$$

a non-orthogonal halftone cell and halftone line screen selector circuit, routine or agent that selects one of the identified combinations;

wherein each non-orthogonal halftone cell or line screen of the selected identified combination is associated with one or more color separations of a color halftone printer.

20. The apparatus according to claim 19, further comprising:

a located non-orthogonal halftone cell and line screen removing circuit, routing or agent that removes located non-orthogonal cells and line screens according to a set of locating constraints.

21. The apparatus according to claim 20, further comprising:

a non-orthogonal halftone cell combination and line screen removing circuit, routine or agent that removes non-orthogonal halftone cell and line screen combinations according to a set of combination removing constraints.

22. The apparatus according to claim 19, further comprising:

a non-orthogonal halftone cell combination and line screen removing circuit, routine or agent that removes non-orthogonal halftone cell and line screen combinations according to a set of combination removing constraints.

23. The apparatus according to claim 19, wherein the non-orthogonal halftone cell and line screen combination identifying circuit, routine or agent identifies less than three non-orthogonal halftone cells and line screens of the located non-orthogonal halftone cells and line screens.

24. A method for using a plurality of non-orthogonal halftone screens for substantially moiré-free color halftoning, comprising:

inputting an image data;

converting the image data to a halftone image data;

using a plurality of tileable halftone screens that contain combinations of non-orthogonal halftone cells where each non-orthogonal halftone cell is substantially specified by two spatial vectors $(x_{n_1}, y_{n_1})$ and $(x_{n_2}, y_{n_2})$, where, $x_{n_1}, y_{n_1}$ and $x_{n_2}, y_{n_2}$ are substantially integer valued;

identifying combinations of the located non-orthogonal halftone cells, suitable for tiling an image plane, of at least three of the located non-orthogonal halftone cells where the spatial vectors of the identified combinations satisfy:

$$A_b A_c x_{a_1} + A_c A_a x_{b_1} + A_a A_b x_{c_1} \cong 0,$$

$$A_b A_c y_{a_1} + A_c A_a y_{b_1} + A_a A_b y_{c_1} \cong 0,$$

$$A_b A_c x_{a_2} + A_c A_a x_{b_2} + A_a A_b x_{c_2} \cong 0, \text{ and}$$

$$A_b A_c y_{a_2} + A_c A_a y_{b_2} + A_a A_b y_{c_2} \cong 0,$$

where,
the subscripts 1 and 2 are arbitrary and interchangeable,
n=a, b, c, where,
a, b, c are arbitrary color indices; and
$A_n = |x_{n_1} y_{n_2} - x_{n_2} y_{n_1}|$; and
forming an image on an image recording medium using the halftone image data.

25. The apparatus according to claim 24, wherein non-orthogonal includes cell shapes containing right angles.

26. The method according to claim 24, further comprising:
applying constraints to the located non-orthogonal halftone cells; and
removing non-orthogonal halftone cells that do not satisfy the constraints from the located non-orthogonal halftone cells.

27. The method according to claim 26, further comprising:
applying constraints to the identified combinations of non-orthogonal halftone cells; and
removing combinations of non-orthogonal halftone cells that do not satisfy the constraints from the identified combinations of non-orthogonal halftone cells.

28. The method according to claim 24, further comprising:
applying constraints to the identified combinations of non-orthogonal halftone cells; and
removing combinations of non-orthogonal halftone cells that do not satisfy the constraints from the identified combinations of non-orthogonal halftone cells.

29. The method according to claim 24, wherein, the identifying combinations step, identifies less than three of the located non-orthogonal halftone cells.

30. A method for using a plurality of non-orthogonal halftone screens for substantially moiré-free color halftoning, comprising:
inputting an image data;
converting the image data to a halftone image data;
using a plurality of tileable halftone screens that contain combinations of located non-orthogonal halftone cells and line screens; where,
each non-orthogonal halftone cell is substantially specified by two spatial vectors $(x_{n_1}, y_{n_1})$ and $(x_{n_2}, y_{n_2})$, where, $x_{n_1}, y_{n_1}$ and $x_{n_2}, y_{n_2}$ are substantially integer valued, where,
each line screen is substantially specified by two spatial vectors $(x_{m_1}, y_{m_1})$ and $(x_{m_2}, y_{m_2})$ that substantially form a halftone line screen, where, $x_{m_1}, y_{m_1}$ and $x_{m_2}, y_{m_2}$ are substantially integer values while satisfying:
either $y_{m_1} = 0$ and $y_{m_2} = 1$,
or $x_{m_1} = 0$ and $x_{m_2} = 1$, where,
the spatial vectors of the combinations of located non-orthogonal halftone cells and line screens satisfy:

$$A_b A_c x_{a_2} + A_c A_a x_{b_2} + A_a A_b x_{c_2} \cong 0, \text{ and}$$

$$A_b A_c y_{a_2} + A_c A_a y_{b_2} + A_a A_b y_{c_2} \cong 0,$$

where,
the subscripts 1 and 2 are arbitrary and interchangeable,
n=a, b, c,
m=a, b, c; where
a, b, c are arbitrary color indices; and
$A_n = |x_{n_1} y_{n_2} - x_{n_2} y_{n_1}|$;
selecting one of the identified combinations; and
associating each non-orthogonal halftone cell or line screen of the selected identified combination with one or more color separations of a color image generating system; and
forming an image on an image recording medium using the halftone image data.

31. The method according to claim 30, wherein non-orthogonal includes cell shapes containing right angles.

32. The method according to claim 30, further comprising:
applying constraints to the located non-orthogonal halftone cells and line screens; and
removing non-orthogonal halftone cells and line screens that do not satisfy the constraints from the located non-orthogonal halftone cells and line screens.

33. The method according to claim 32, further comprising:
applying constraints to the identified combinations of non-orthogonal halftone cells and line screens; and
removing combinations of non-orthogonal halftone cells and line screens that do not satisfy the constraints from the identified combinations of non-orthogonal halftone cells and line screens.

34. The method according to claim 30, further comprising:
applying constraints to the identified combinations of non-orthogonal halftone cells and line screens; and
removing combinations of non-orthogonal halftone cells and line screens that do not satisfy the constraints from the identified combinations of non-orthogonal halftone cells and lines screens.

35. The method according to claim 30, wherein, the identifying combinations step, identifies less than three of the located non-orthogonal halftone cells and line screens.

* * * * *